(12) United States Patent
Chancellor et al.

(10) Patent No.: US 6,942,797 B1
(45) Date of Patent: Sep. 13, 2005

(54) FILTRATION USING PRESSURE VESSEL WITH MULTIPLE FILTRATION CHANNELS

(75) Inventors: Dennis Chancellor, Falls of Rough, KY (US); James Jensen, San Diego, CA (US)

(73) Assignee: NATE International, Woodland Hills, CA (US)

( * ) Notice: Subject to any disclaimer, the term of this patent is extended or adjusted under 35 U.S.C. 154(b) by 0 days.

(21) Appl. No.: 10/019,066

(22) PCT Filed: Feb. 4, 2000

(86) PCT No.: PCT/US00/03107

§ 371 (c)(1),
(2), (4) Date: Jun. 24, 2002

(87) PCT Pub. No.: WO00/72949

PCT Pub. Date: Dec. 7, 2000

Related U.S. Application Data

(60) Provisional application No. 60/136,739, filed on May 27, 1999.

(51) Int. Cl.⁷ .............................................. B01D 63/12
(52) U.S. Cl. ........................... 210/321.64; 210/321.66; 210/321.76; 210/321.79; 210/321.86; 210/321.88; 210/650; 210/652; 210/443; 210/446

(58) Field of Search ...................... 210/321.64, 321.66, 210/321.76, 321.79, 321.86, 321.88, 650, 210/652, 443, 446

(56) References Cited

U.S. PATENT DOCUMENTS

| | | | | |
|---|---|---|---|---|
| 4,083,780 A | * | 4/1978 | Call ........................... | 210/652 |
| 4,983,305 A | * | 1/1991 | Oklejas et al. .............. | 210/642 |
| 5,470,469 A | * | 11/1995 | Eckman ................... | 210/321.8 |

* cited by examiner

*Primary Examiner*—W. L. Walker
*Assistant Examiner*—K. S. Menon
(74) *Attorney, Agent, or Firm*—Rutan & Tucker, LLP

(57) ABSTRACT

A filtration system includes an outer casing (210) that houses a plurality of elongated inner casings (220A–220F), which in turn house a plurality of filtration membranes. The outer casing, inner casing, and filtration membranes are disposed relative to one another to provide a three-flow channel system that provides additional feed fluid at one or more membrane couplings between membranes of the same inner casing. Ths arrangement defines a feed fluid flow path in which a feed fluid exiting from an upstream filter into a downstream filter is diluted by additional feed fluid.

16 Claims, 7 Drawing Sheets

FILTRATION USING PRESSURE VESSEL WITH MULTIPLE FILTRATION CHANNELS

This application claims priority to provisional patent application No. 60/136,739 filed May 27, 1999, which is incorporated by reference herein in its entirety.

FIELD OF THE INVENTION

The present invention relates generally to filtration of fluids, including especially filtration of water.

BACKGROUND

There is a great worldwide demand for purified fluids, one of the most commercially important of which is production of fresh water. Many areas of the world have insufficient fresh water for drinking or agricultural uses, and in other areas where plentiful supplies of fresh water exist, the water is often polluted with chemical or biological contaminants, metal ions and the like. There is also a continuing need for commercial purification of other fluids such as industrial chemicals and food juices. U.S. Pat. No. 4,759,850, for example, discusses the use of reverse osmosis for removing alcohols from hydrocarbons in the additional presence of ethers, and U.S. Pat. No. 4,959,237 discusses the use of reverse osmosis for purifying orange juice.

Aside from distillation techniques, purification of water and other fluids is commonly satisfied by filtration. There are many types of filtration, including reverse osmosis (RO), which may involve ultra-filtration or hyper-filtration, and all such technologies are referred to herein using the generic term, "filtration."

Reverse osmosis involves separation of constituents under pressure using a semi-permeable membrane. As used herein, the term membrane refers to a functional filtering unit, and may include one or more semi-permeable layers and one or more support layers. Depending on the fineness of the membrane employed, reverse osmosis can remove particles varying in size from the macro-molecular to the microscopic, and modern reverse osmosis units are capable of removing particles, bacteria, spores, viruses, and even ions such as $Cl^-$ or $Ca^{++}$.

There are several problems associated with reverse osmosis (RO), including excessive fouling of the membranes and high energy costs associated with producing the required pressure across the membranes. These two problems are interrelated in that most or all of the known RO units require flushing of the membranes during operation with a relatively large amount of feed liquid relative to the amount of permeate produced. The ratio of flushing liquid to permeate recovery in sea water desalination, for example, is about 3:1. Because only a portion of the water being pumped is recovered as purified water, energy used to pump the excess brine is wasted, creating an inherent inefficiency.

It is known to mitigate the energy cost of filtration pumping by employing a work exchange pump such as that described in U.S. Pat. No. 3,489.159 to Cheng et al. (January 1970) which is incorporated herein by reference. In such systems, pressure in the flushing or "waste" fluid that flows past the filter elements is used to pressurize the feed fluid. Unfortunately, known work exchange pumps employ relatively complicated piping, and in any event are discontinuous in their operation. These factors add greatly to the overall cost of installation and operation.

It is also known to mitigate the energy cost of filtration pumping by employing one or more turbines to recover energy contained in the waste fluid. A typical example is included as FIG. 3 in PCT/ES96/00078 to Vanquez-Figueroa (publ. October 1996), which is also incorporated herein by reference. In that example, a feed fluid is pumped up a mountainside, allowed to flow into a filtration unit partway down the mountain, and the waste fluid is run through a turbine to recover some of the pumping energy.

A more generalized schematic of a prior art filtration system employing an energy recovery turbine is shown in FIG. 1. There a filtration system 10 generally comprises a pump 20, a plurality of parallel permeators 30, an energy recovery turbine 40, and a permeate or filtered fluid holding tank 50. The fluid feed lines are straightforward, with an intake line (not shown) carrying a feed fluid from a pretreatment device (not shown) to the pump 20, a feed fluid line 22 conveying pressurized feed fluid from the pump 20 to the permeators 30, a permeate collection line 32 conveying depressurized permeate from the permeators 30 to the holding tank 50, a waste fluid collection line 34 conveying pressurized waste fluid from the permeators 30 to the energy recovery turbine 40, and a waste fluid discharge line 42 conveying depressurized waste fluid from the energy recovery turbine 40 away from the system 10.

A system according to FIG. 1 may be relatively energy efficient, but is still somewhat complicated from a piping standpoint. Among other things, each permeator 30 has at least three pressure connections—one for the feed fluid, one for the waste fluid, and one for the permeate. In a large system such fluid connections may be expensive to maintain, especially where filtration elements in the permeators need to be replaced every few years.

U.S. Pat. No. 547,0469 to Eckman (November 1995) describes a pressure vessel that houses one or more hollow fiber membrane cartridges. The outer circumference of the membranes do not extend completely to the inner wall of the production vessel, allowing convenient replacement of the cartridges, and also providing an annular space between the outer portion of the filters and the inner wall of the production vessel that is used as part of the waste fluid flowpath. The annular space is only continuous along a single cartridge, however, and is interrupted between adjacent cartridges by an annular sealing ring at one end of each cartridge.

WIPO publication 98/46338 discloses an improvement over Eckman in which the annular spaces between the outer portion of the membranes and the inner wall of the production vessel can be continuous past multiple modules (cartridges). Among other things, the improvement extends the convenient replacement benefits of the Eckman design to spiral wound filters.

Both U.S. Pat. No. 547,0469 and WIPO 98/46338 are also advantageous in that they reduce the ratio of couplings relative to the number of filters. In an ordinary reverse osmosis filtration system, three couplings are required to provide fluid flow paths to a single membrane, one coupling for each of the feed fluid, waste fluid, and permeate flow paths. The ratio is thus 3:1. However, in the U.S. Pat. No. 547,0469 and WIPO 98/46338 designs, only three couplings are still required to provide fluid flow paths to multiple membranes. Thus, if the pressure vessel contains three membranes, the ratio is 3:3, and if the pressure vessel contains five membranes, the ratio is 3:5.

It would be advantageous to reduce the ratio of couplings relative to the number of filters still further, but five membranes is usually considered to be the upper limit in an Eckman type system because pressure drops past the several membranes reduce the feed fluid pressure to an undesirable degree. Thus, there is still a need to provide filtration systems, and especially reverse osmosis filtration systems, that reduce the ratio of couplings relative to the number of filters (the coupling/filter ratio) to less than 3:5.

SUMMARY OF THE INVENTION

The present invention is directed to modularized filtration systems in which an elongated outer casing houses a plurality of elongated inner casings, which in turn house a plurality of filters (membranes). The outer casing, inner casings, and filters are disposed relative to one another to provide a three-flow channel system that provides additional feed fluid at one or more of the membrane couplings between membranes of the same inner casing.

In preferred embodiments the feed fluid flow path comprises an annular space between the inner casings and the filters contained in such casings, and in more preferred embodiments the annular space is substantially continuous past multiple filters of the same inner casing. The inner casings may advantageously have openings that fluidly communicate with the lumen of the outer casing, thereby reducing the ratio of couplings relative to the number of filters (the coupling/filter ratio).

In especially preferred embodiments the coupling/filter ratio $\leq 1:2$, in more preferred embodiments the coupling/filter ratio $\leq 1:3$, and in still more preferred embodiments the coupling/filter ratio $\leq 1:4$.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
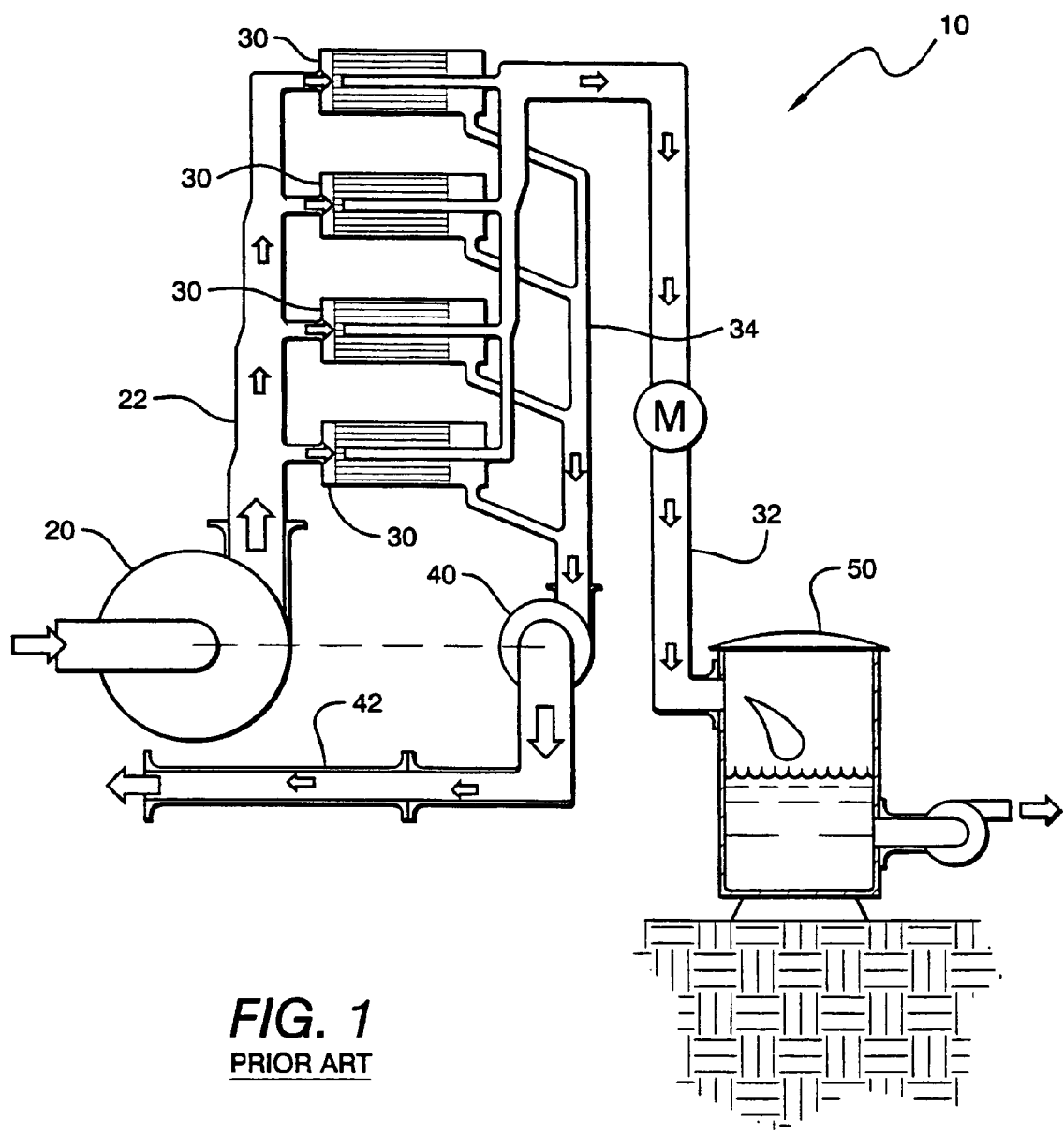
FIG. 1 is a schematic of a prior art filtration system employing an energy recovery turbine.
Figure 2:
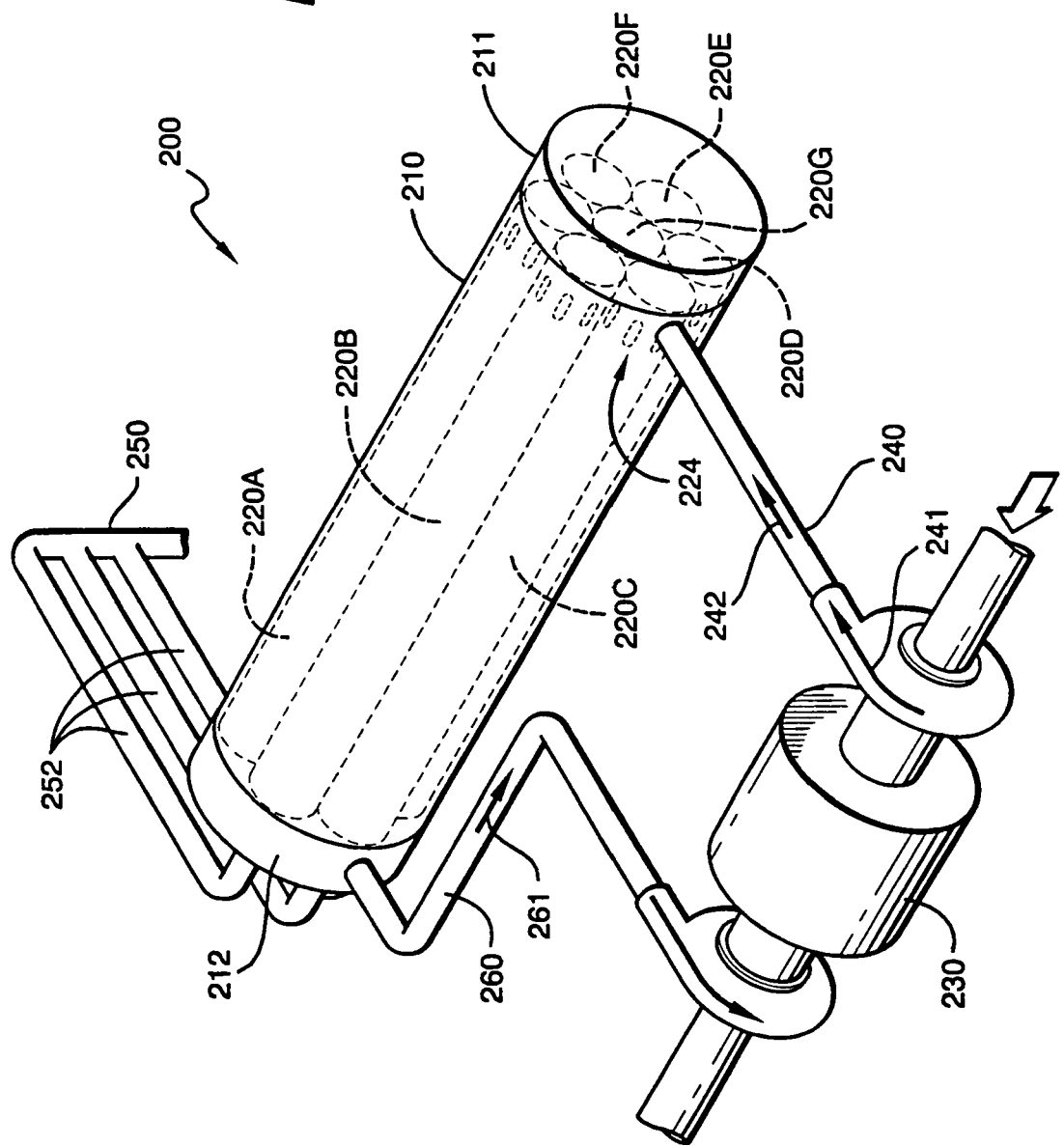
FIG. 2 is a schematic of a preferred filtration system employing an energy recovery device.

In FIG. 2 a preferred filtration system 200 generally comprises an outer casing 210 containing multiple internal casings 220A–220G in which filters (not shown) are disposed, and a pump/energy recovery unit 230. Feed fluid is fed to the end plate subassembly 211 of the outer casing 210 from feed fluid line 240, and passes into the internal casings 220A–220G via openings 224 in the walls of the internal casings 220A–220G. The feed fluid is filtered by the filters, with permeate being removed from the internal casings 220A–220G at end plate subassembly 212 via permeate manifold 252 and permeate line 250, and waste fluid being removed from the internal casings 220A–220G via waste fluid line 260. Arrows 241 and 242 depict fluid flow in line 240, and arrow 261 depicts fluid flow in line 260.

The outer casing 210 advantageously comprises a hollow cylinder, although other elongated shapes including those having triangular, rectangular, or octagonal cross sections are also contemplated. The dimensions of the outer casing 210 depend upon the rate of fluid being filtered, with larger dimensions accommodating greater production flows. Outside dimensions of commercial systems employed in purifying brine are contemplated to fall between about 0.5 meters to several meters in diameter, and between about three to forty or fifty meters in length. Outer casing 210 may be fabricated from metal, plastic, composite, concrete, reinforced concrete, or any other materials that are strong enough to withstand pressure differentials produced by the pump/energy recovery unit 230, and that cannot readily be solubilized by the fluid being processed. The outer casing 210 is preferably maintained above ground for easy access, but in alternative embodiments may also be placed below ground, or underwater. Horizontal, vertical, and all other possible dispositions are contemplated.

Each of the internal casings 220A–220G is also contemplated to comprise an elongated shape, such as a hollow cylinder, but with the added limitation that multiple internal casings should fit within the lumen of the outer casing 210. In addition, since one of the fluid pathways extends through the openings 224 in the walls of the internal casings 220A–220G, (the feed fluid in the embodiment shown in FIG. 2), the shapes of the internal casings 220A–220G should allow for fluid flow around the perimeters of the internal casings 220A–220G. The internal casings 220A–220G are again preferably fabricated from metal, plastic, or composite, that is insoluble in the various fluids, but here the walls do not need to be especially strong since the openings 224 may substantially equalize the pressure differential across the walls. At the very least, the openings 224 are preferably dimensioned to limit the pressure inside the internal casings 220A–220G to no more than a 20% drop relative to the pressure outside the internal casings 220A–220G. In FIG. 2 the openings 224 are positioned towards one end of each of the inner casings 220A–220G. Preferred shapes for the openings 224 are slots oriented along the long axis of the internal casings 220A–220G, although circular holes and other shapes are also contemplated.

Contemplated filters may comprise any suitable material, including reverse osmosis membranes. Filters are preferably spiral wound, as for example, those discussed in WO 98/09718. In other embodiments, however, any other types of filters can be employed. Thus, it is expressly contemplated to employ flat membrane, tubular, spiral, and/or hollow tube type filters. Hollow type filters can, for example, be deployed in a manner similar to that described in U.S. Pat. No. 5,470,469 to Eckman (November 1995). The filters are preferably dimensioned to provide an annular space between the filters and the inside wall(s) of the inner casings 220A–220G. The term "annular" in "annular space" should be interpreted loosely, and is intended to include round spaces, oval spaces, rectangular spaces, and so forth. The average thickness of the annular spaces (i.e., the average distance between the outer circumference of the filters and the inside wall(s) of the inner casings 220A–220G) preferably ranges from about 1 mm to about 10 cm. Multiple filters are preferably serially disposed in each of the inner casings 220A–220G, and the annular space within any given inner casing is preferably continuous across (i.e. along) the long axis of at least several consecutive filters.

The pump/energy recovery unit 230 forces the feed fluid in feed fluid line 240 under pressure into the outer casing 210, through the openings 224 into the lumen of the inner casings 220A–220G, and thence to the high-pressure side of the various filters. Some of the feed fluid is forced through the filters to become permeate, and leaves the system via permeate manifold 252 and permeate line 250. Some of the feed fluid effectively flushes the high-pressure side of the filters as waste fluid. The waste fluid leaves the system via waste fluid line 260, and possibly a waste fluid manifold (not shown). In line 260 the waste fluid line is still pressurized, and some of the energy in the pressurized waste fluid is recovered in pump/energy recovery unit 230.

It is contemplated that any pump or pump system that provides adequate pumping volume and pressure may be employed in filtration system 200. This includes positive displacement pumps, impeller pumps, head pressure devices, and many others. On the other hand, some pumps and pumping systems will be more efficient than others, and such pumps and systems are particularly contemplated. An especially efficient pumping system is a two stage turbine pump, in which feed fluid flows first to a relatively low-pressure turbine and then on to a relatively high-pressure turbine. It is also contemplated that the pump portion of the pump/energy recovery unit 230 may be physically separated from the energy recovery portion, or that a pump portion may be present without any energy recovery portion.

Filtration systems employing one or more outer casings 210 may be deployed in any suitable manner. As such, contemplated filtration systems may be disposed more or less horizontally on, above or below the surface of the ground, or in some other configuration such as a partially buried disposition. In other contemplated embodiments, for example, filtration systems may be set into a shallow well, perhaps less than 100 or even less than 50 feet deep. In still other embodiments, filtration systems may be disposed within or as part of a tower, hillside, or mountain. In yet another aspect, multiple filtration systems may be coupled together in any combination of dispositions.

Figure 3:
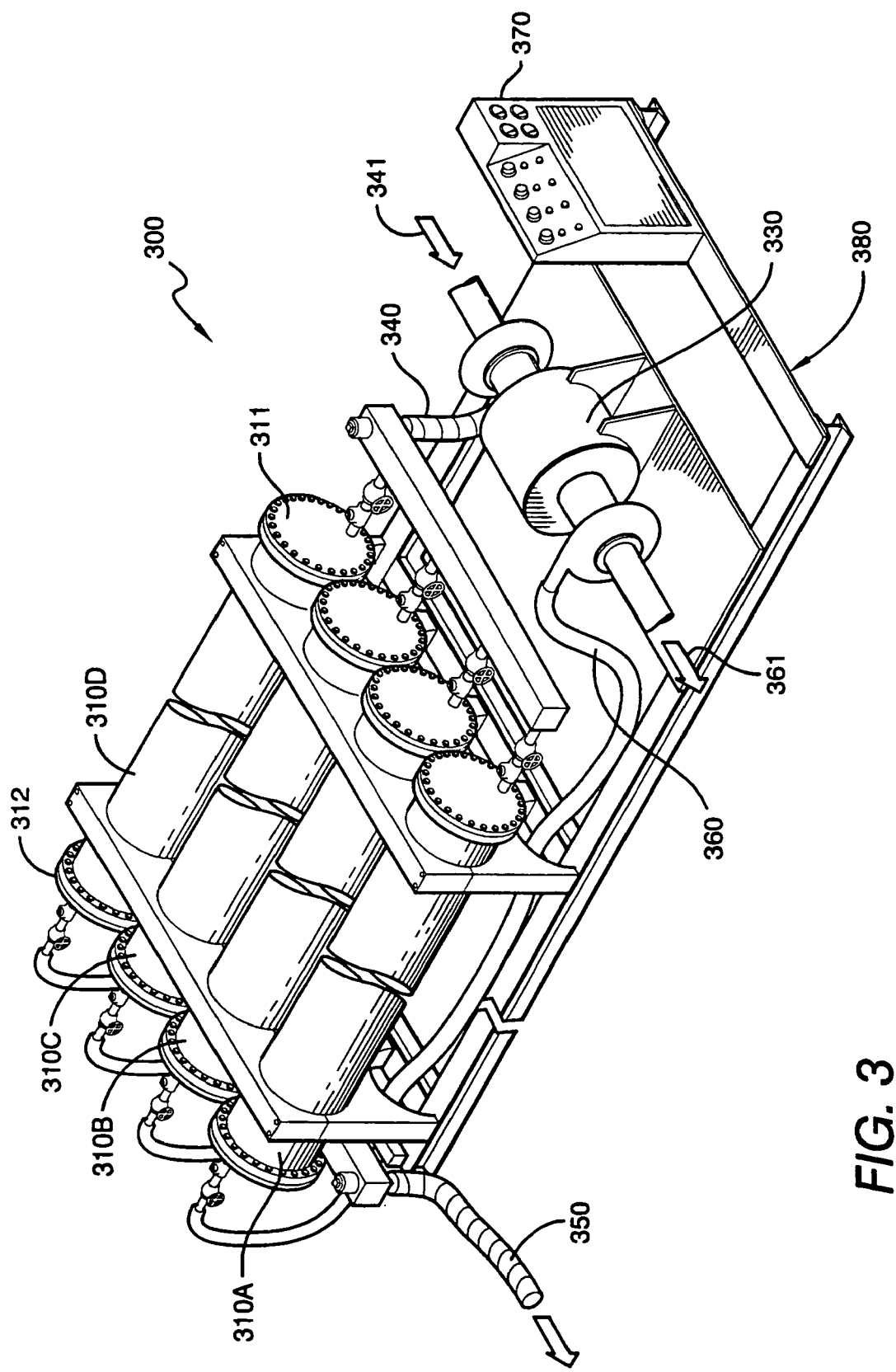
FIG. 3 is a schematic of a filtration system employing a field of outer casings.

In FIG. 3, a filtration system 300 includes four outer casings 310A–310D, each of which contains multiple inner casings (not shown), a pump/energy recovery unit 330, a feed fluid line 340 with fluid flow depicted by arrow 341, a permeate exit line 350, and a waste fluid line 360 with fluid flow depicted by arrow 361, and end plate subassemblies 311, 312, the elements of which are substantially as described above with respect to FIG. 2. A control panel 370 is also present to control the operation, and the entire filtration system 300 includes a base, skid, or rack 380 to facilitate placement and access.

Figure 4:
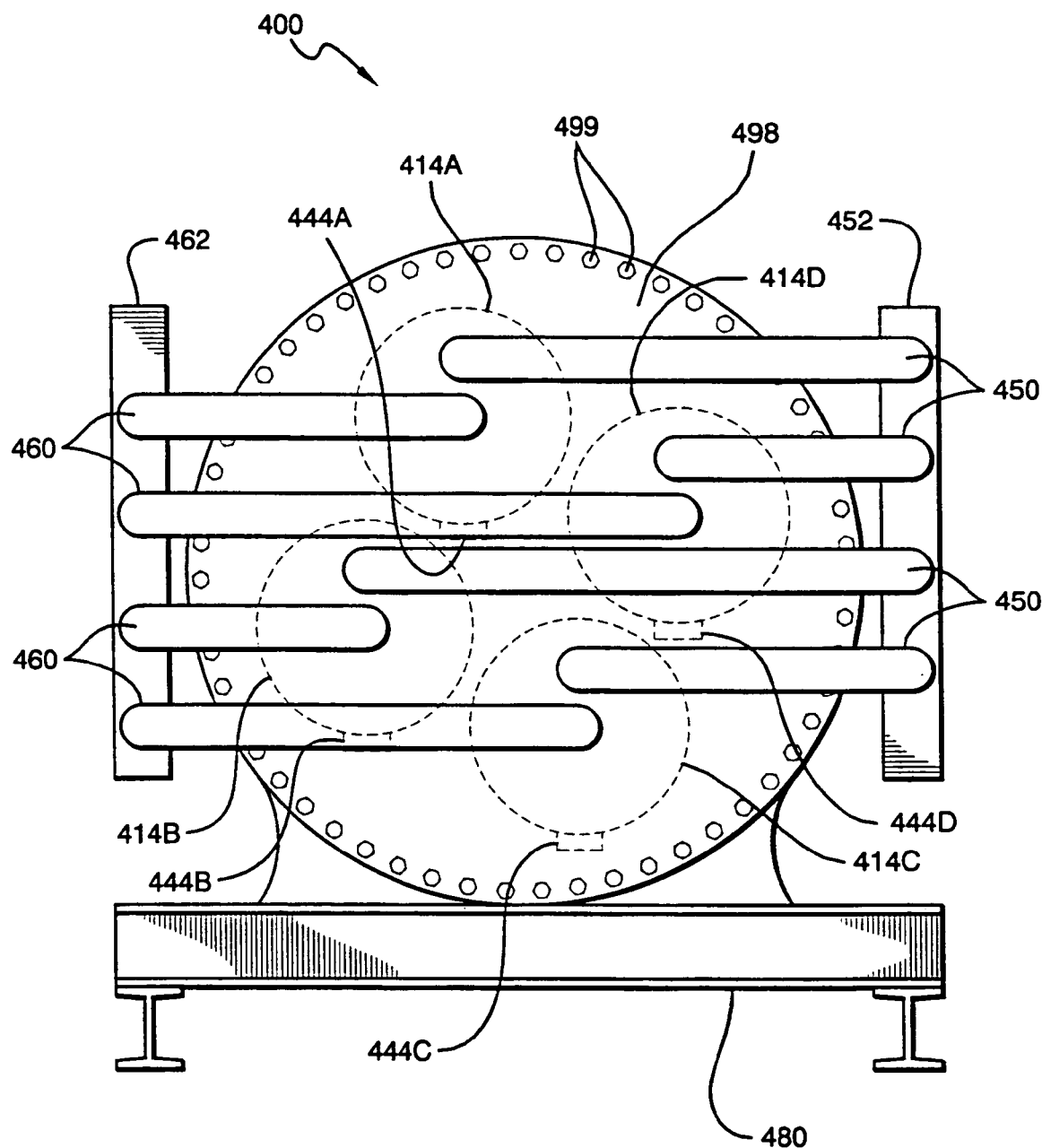
FIG. 4 is a schematic of a preferred end cap for an inner casing.

In FIG. 4, an end plate subassembly 400 includes an end plate 498 coupled to a main body (not shown) of an outer casing (not shown) using bolts 499. End plate subassembly 400 is similar in function and appearance to endplate subassemblies 212 and 312 of FIGS. 2 and 3, respectively, except that here there are only four inner casings (not shown) rather than five inner casings 220A–220G as in FIG. 2. The specific number of inner casings is generally not critical to the operation. The end caps 414A–414D of the four inner casings (not shown) are coupled to the permeate manifold 462 through permeate lines 460. Waste fluid exits the outer casing though waste fluid lines 450, and waste fluid manifold 452. The base, skid, or rack 480 used to facilitate placement and access is also shown to establish context.

Figure 5:
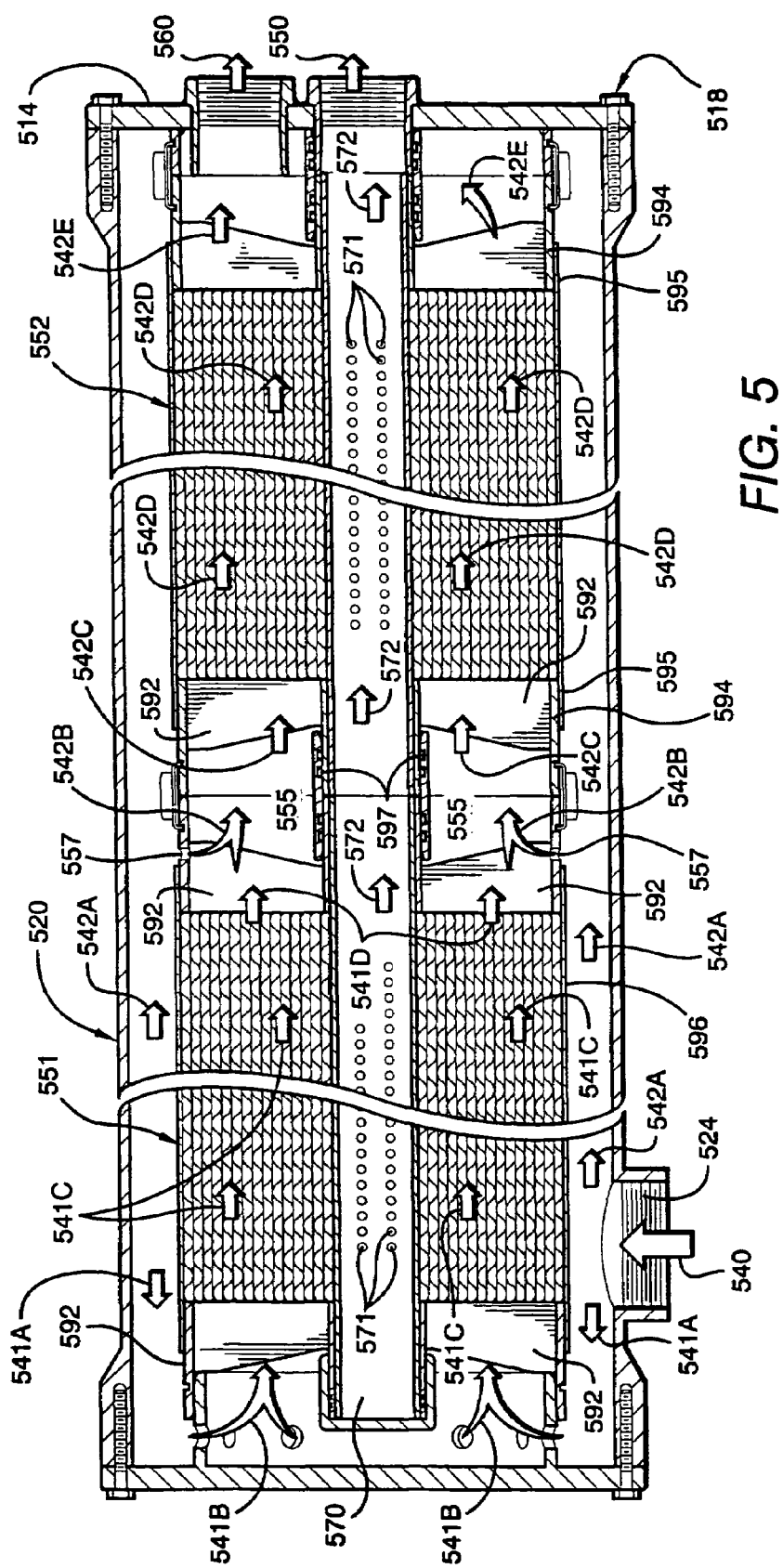
FIG. 5 is a cross-section of a preferred inner casing, in which waste fluid from an upstream filter is supplemented by fresh feed fluid before being fed into a downstream filter, and both waste fluid and permeate streams exit the inner casing at the same end.

FIG. 5 depicts preferred details of the fluid flows and structural aspects of elements employed within a preferred inner casing, depicted here as inner casing 520, which may (for example, be the inner casing of FIG. 4. Considering the fluid flows first, a feed fluid enters opening 524 (similar to openings 224 of FIG. 2) along arrow 540, and travels along arrows 541A and 541B to one end of a first filter 551. The fluid then flows along arrows 541C through filter 551, with permeate passing through collector pores 571 into permeate collector line 570, and waste fluid flowing along arrows 541D to act as a feed fluid for a downstream filter 552.

The waste fluid flowing along arrow 541D enters the inter-filter space 555 where it joins fresh feed fluid traveling along arrows 542A, 542B to form a combined stream 542C. The combined stream 542C then enters the downstream filter 552 in a manner similar to feed fluid entering along arrow 541B entering the upstream filter 551. In downstream filter 552 permeate passes along arrows 542D through collector pores 571 into permeate collector line 570, and then travels along arrows 572 to exit the inner casing at arrow 550. Waste fluid flows along arrows 542E, and at the end of a series of filters fluidly coupled as described immediately above, accumulated waste fluid exits the inner casing 520 at arrow 560.

The waste fluid of each filter experiences a drop in pressure relative to the feed fluid entering the filter, and has a correspondingly higher concentration of salts or other compounds removed by the filter. A typical pressure drop may be from about 200 psi to about 190 psi across a single filter. However, due to the addition of fresh (i.e. "bypass" or "additional") feed fluid at the inter-filter spaces 555, the waste fluid exiting at arrow 560 typically has a pressure of about 180 psi. Permeate exiting at arrow 550 has an even lower pressure, which may typically be about 10 psi.

Restriction orifices 557 advantageously lower the pressure of additional feed fluid entering inter-filter space 555 along arrow 542B. The amount and pressure of the additional feed fluid along arrow 542B is advantageously controlled to improve downstream membrane performance, while avoiding excessive backpressure on upstream membranes. Of the 100% of fluid entering the system it is preferred that between about 50%–70% of the fluid will enter the most upstream membrane, with about 50%–30% being used as supplemental feed to downstream membranes. In more preferred embodiments, the numbers are contemplated to be closer to about 50% of the fluid entering the most upstream membrane, and about 40% being used as supplemental feed to downstream membranes. The preferred distribution among downstream membranes depends on the number of membranes, and generally increases as the fluid flows downstream. Thus, where there are four downstream membranes, the distribution of supplemental feed relative to the original feed entering the system may be about 7%, 8%, 11%, and 13%. Where there are only two downstream membranes, the distribution of supplemental feed relative to the original feed entering the system may be about 15% and 25%.

From a structural perspective, FIG. 5 also depicts additional details that may be present in preferred embodiments such as those of FIG. 2 or 3. For example, on each end of the filters it is advantageous to place an anti-telescoping device such as ATD ribs 592. The complete ATDs are made from several components, including the ribs 592, inner couplings 594, and outer couplings 595, which may simply be short lengths of plastic or other piping.

The filters 551, 552 and outer couplings 595 may advantageously be centered in the casing by a series of tabs or spacers (not shown) attached to the ATD ribs 592. These tabs are intended to keep the filters from binding/sticking during insertion or removal. Seals (not shown) can be included as needed. It should be appreciated that because the ATD ribs 592 may be connected in series by inner and outer couplings 594, 595 using watertight seals 597, the internal casings may be viewed as serving mainly to align the membranes and couplings in series. Consequently, the internal casings can have slits or other openings along their lengths, or guide rails can be used as equivalents in place of the casings to align the membrane/coupling components, provided that the last inner coupling 594 would be sealed against the end plate of the outer casing.

With respect to other structural features, it should be appreciated that the end plate 514 (which may also be the same as any of the end plates 414A–414D of FIG. 4) is preferably coupled to a body of the inner casing 520 using a nut and bolt system 518.

Figure 6:
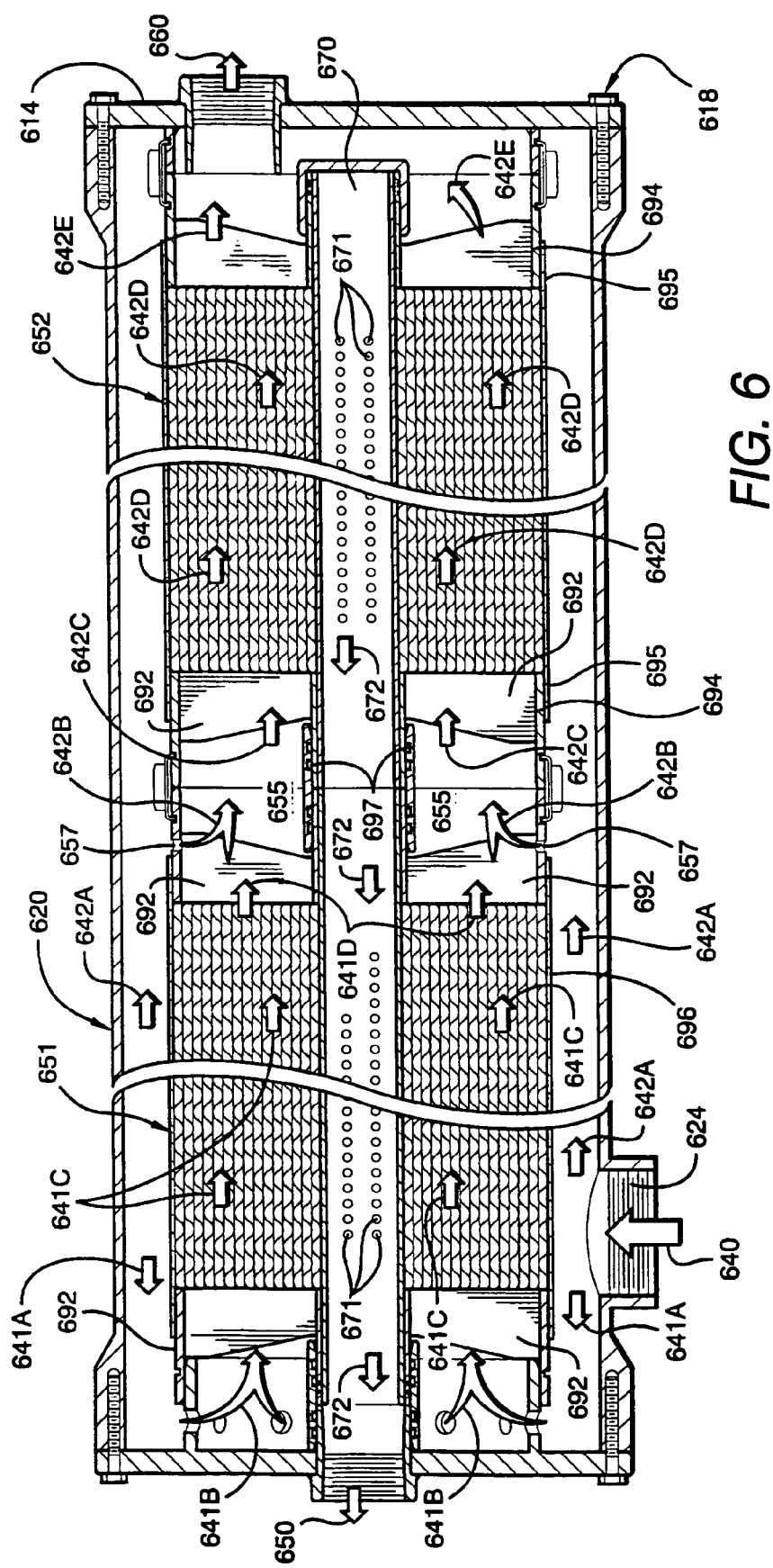
FIG. 6 is a cross-section of an alternative preferred inner casing, in which waste fluid from an upstream filter is supplemented by fresh feed fluid before being fed into a downstream filter, and the waste fluid and permeate streams exit the inner casing at the opposite ends.

FIG. 6 depicts an alternative preferred inner casing that is similar to the case of FIG. 5 except that the waste fluid and permeate streams exit the inner casing at the opposite ends rather than at the same end. The numerals correspond with those of FIG. 5 except that they are increased in value by 100. Thus, a feed fluid enters opening 624 (similar to openings 224 of FIG. 2 and opening 524 of FIG. 5) along arrow 640, and travels along arrows 641A and 641B to one end of a first filter 651. The fluid then flows along arrows 641C through filter 651, with permeate passing through collector pores 671 into permeate collector line 670 and thence along arrows 672, with waste fluid flowing along arrows 641D to act as a feed fluid for a downstream filter 652. The waste fluid flowing along arrow 641D enters the inter-filter space 655 where it joins fresh feed fluid traveling along arrows 642A and 642B to form a combined stream 642C. The combined stream 642C then enters the downstream filter 652 in a manner similar to feed fluid entering along arrow 641B entering the upstream filter 651. In downstream filter 652 permeate passes along arrows 642D through collector pores 671 into permeate collector line 670, and waste fluid flows along arrows 642E. At the end of a series of filters fluidly coupled as described immediately above, accumulated permeate exits the inner casing 620 at arrow 650. Accumulated waste fluid exits the inner casing 620 at arrow 660. From a structural perspective, ATDs include ribs 692, inner couplings 694, and outer couplings 695, which may simply be short lengths of plastic or other piping. Restriction orifices 657, watertight seals 697 and a nut and bolt system 618 are also depicted.

Figure 7:
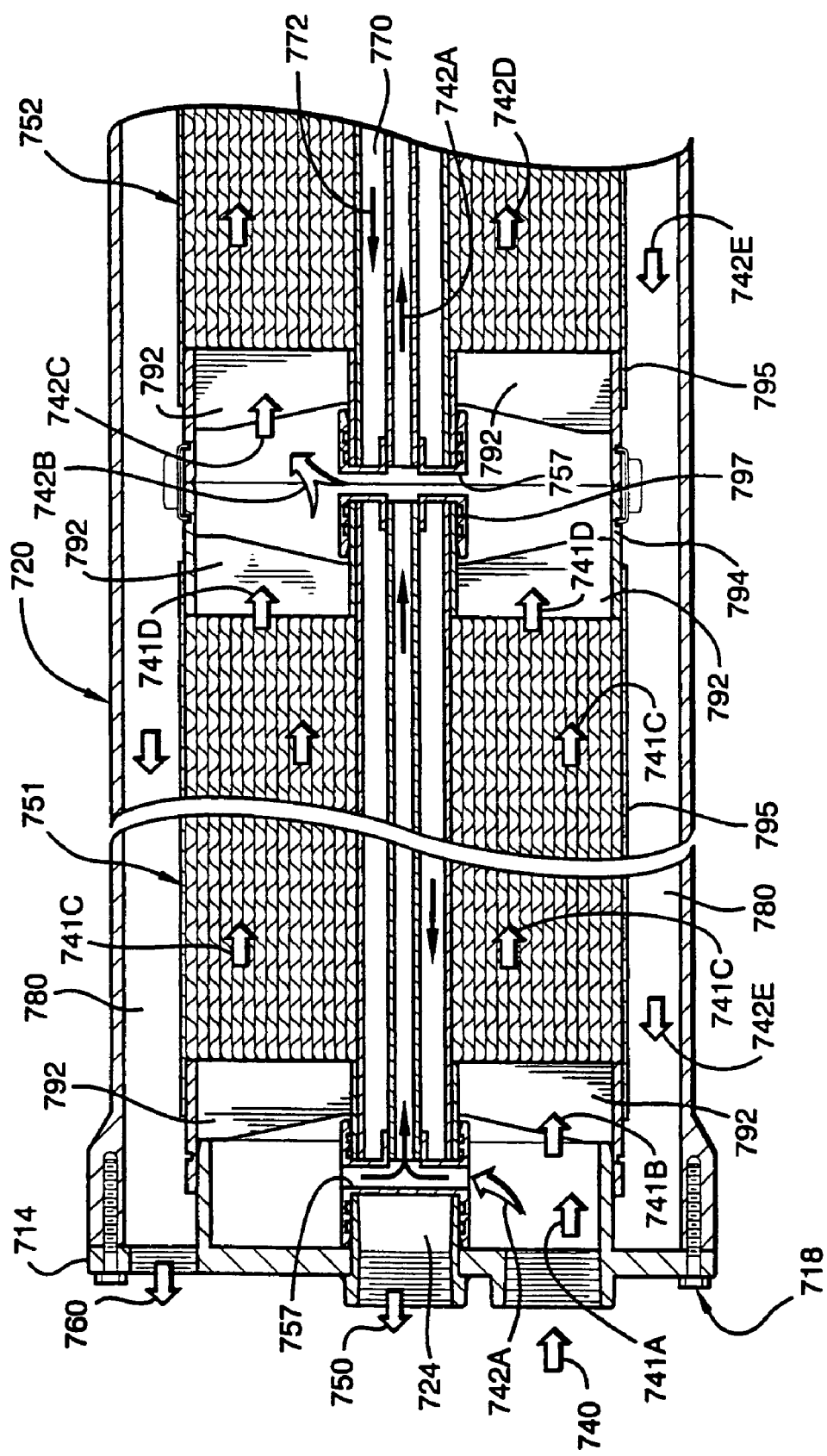
FIG. 7 is a cross-section of another alternative preferred inner casing, in which waste fluid from an upstream filter is supplemented by fresh feed fluid before being fed into a downstream filter, and all three of the feed fluid, waste fluid and permeate streams enter or exit the inner casing at the same end.

FIG. 7 is a cross-section of another alternative preferred inner casing 720, in which waste fluid from an upstream filter 751 is supplemented by fresh feed fluid before being fed into a downstream filter 752, and all three of the feed fluid stream 740, permeate stream 750 and waste fluid stream 760 enter or exit the inner casing at the same end.

In this embodiment the numerals again correspond with those of FIG. 5, except that here they are increased in value by 200. Thus, a feed fluid enters opening 724 (similar to openings 224 of FIG. 2 and opening 524 of FIG. 5) along arrow 740, and travels along arrow 741A and 741B to one end of a first filter 751. The fluid then flows along arrows 741C through filter 751, with permeate passing through collector pores (not shown) into permeate collector line 770 and thence along arrows 772, with waste fluid flowing along arrows 741D to act as a feed fluid for a downstream filter 752. The waste fluid flowing along arrow 741D enters the inter-filter space 755 where it joins with fresh feed fluid traveling along arrows 742A and 742B to form a combined stream 742C. The combined stream 742C then enters the downstream filter 752 in a manner similar to feed fluid entering along arrow 741B entering the upstream filter 751. In downstream filter 752 permeate passes along arrows 742D through collector pores (not shown) into permeate collector line 770, and waste fluid is carried out of the system in channel 780 as shown by arrows 742E. At the end of a series of filters fluidly coupled as described immediately above, accumulated permeate exits the inner casing 720 at arrow 750. Accumulated waste fluid exits the inner casing 720 at arrow 760. From a structural perspective, ATDs include ribs 792, inner couplings 794, and outer couplings 795, which may simply be short lengths of plastic or other piping. Restriction orifices 757, watertight seals 797 and a nut and bolt system 718 are also depicted.

Of course, the arrangement of fluid flows described with respect to FIGS. 5–7 are exemplary only, and many other flows are contemplated. For example, instead of waste fluid flowing in an annular space between the filters and the inside of the inner casing, it is entirely possible for the feed fluid to flow in such space. Alternatively, the permeate could accumulate in the annular space, and feed fluid could flow through the inner core.

The presently described apparatus and methods provide numerous benefits over the prior art. A major advantage is that by permitting feed water to enter at the membrane couplings between membranes of the same inner casing, the waste fluid passing from one series filter to another is diluted, thereby reducing its osmolarity and the pressure needed to operate the system. Lowered pressure allows for the use of lower cost pressure vessels, and lessens the tolerance requirements at the seals.

There are numerous other advantages as well resulting from adding fresh feed fluid to the concentrated fluid exiting an upstream membrane. For example, the additional feed fluid adds to the volume of fluid passing into the downstream membrane, thus increasing the flush rate and reducing the fouling potential. A related benefit is that dilution of the feed fluid entering a downstream membrane reduces the concentration of compounds that may precipitate onto the membranes at higher concentrations. Another benefit is that the additional feed fluid reduces the pressure drop experienced by a downstream membrane, thereby increasing the production of permeate. Still another benefit is that the additional feed fluid reduces the osmotic pressure experienced by the downstream membrane, thereby increasing the rate of filtration.

Not only are these benefits unrecognized in the prior art, but one of ordinary skill would be dissuaded from adding fresh feed fluid to the concentrated fluid exiting an upstream membrane by his knowledge of fluid dynamics. One of ordinary skill would most likely think that adding fresh feed fluid at the membrane couplings between membranes would merely create backpressure that would adversely affect the functioning of the upstream membrane.

Thus, specific embodiments and applications of a filtration system using a pressure vessel with multiple filtration channels have been disclosed. It should be apparent to those skilled in the art, however, that many more modifications besides those already described are possible without departing from the inventive concepts herein. The inventive subject matter, therefore, is not to be restricted except in the spirit of the present disclosure.

What is claimed is:

1. A filtration system comprising:
an elongated outer casing defining an outer lumen;
a plurality of elongated inner casings disposed within the outer lumen, each of the inner casings having an inner lumen in which is disposed an upstream filter and a downstream filter, each of the inner casings also having an upstream inlet positioned upstream of the upstream filter, and a downstream inlet positioned downstream of the upstream filter and upstream of the downstream filter; and
the outer casing, inner casings, and filters disposed relative to one another to define a feed fluid flow path in which a feed fluid that entered an inner casing via an upstream inlet and is exiting from an upstream filter into a downstream filter is diluted by additional feed fluid flowing into the inner casing through the downstream inlet.

2. The filtration system of claim 1 wherein the downstream inlet of an inner casing is a pressure reducing orifice adapted to cooperate with one or more other inlets to cause 50%–70% of feed fluid flowing through the inner casing to enter the upstream filter.

3. The filtration system of claim 2 wherein the opening is dimensioned to produce a maximum operational pressure drop of about 20%.

4. The filtration system of claim 1 further comprising a manifold fluidly coupling the inner lumen of each of the inner casings, and another manifold fluidly coupling the core space of each of the inner casings.

5. The filtration system of claim 4 having opposite ends, and both of the manifolds extending from the same one of the opposite ends.

6. The filtration system of claim 1 wherein at least one of the inner casings contains a plurality of the filters serially disposed to provide a substantially continuous core space, and wherein a permeate flow path extends through the substantially continuous core space.

7. The filtration system of claim 6 wherein the serial disposition of the filters in at least one of the inner casings defines a substantially continuous annular space between an inner wall of each of the inner casings and the filters disposed within the inner casings.

8. The filtration system of claim 1 wherein at least one of the filters is spiral wound.

9. The filtration system of claim 1 wherein at least one of the filters comprises hollow fiber membranes.

10. The filtration system of claim 1 further comprising an energy recovery device that derives energy from a waste fluid in the waste fluid flowpath.

11. The filtration system of any one of claim 1 wherein the outer casing is disposed substantially above ground.

12. The filtration system of claim 1 having a coupling/filter ratio $\leq 1:2$.

13. The filtration system of claim 1 having a coupling/filter ratio $\leq 1:3$.

14. The filtration system of claim 1 having a coupling/filter ratio $\leq 1:4$.

15. A filtration system comprising:
an elongated outer casing defining an outer lumen; and
a plurality of elongated inner casings disposed within the outer lumen, at least one of the inner casings having an inner lumen in which is disposed an upstream and a downstream filter, such that substantially all of a waste fluid exiting the upstream filter is directed as a feed fluid into the downstream filter, and is supplemented by additional feed fluid entering the inner lumen through a downstream inlet at a point between the upstream filter and downstream filter.

16. The filtration system of claim 15 wherein 50%–70% of any feed fluid entering the at least one of the inner casings enters the inner casing upstream of the upstream filter, and 50%–30% of the feed fluid entering the same inner casing enters at a point downstream of the upstream filter.

* * * * *